(12) United States Patent
Irvin

(10) Patent No.: US 9,283,668 B2
(45) Date of Patent: Mar. 15, 2016

(54) IMPLEMENT WITH A SHAFT ATTACHED TO A TOOL PORTION VIA A PLUG

(76) Inventor: Timothy James Irvin, Lake Hawea RD2 (NZ)

( * ) Notice: Subject to any disclaimer, the term of this patent is extended or adjusted under 35 U.S.C. 154(b) by 141 days.

(21) Appl. No.: 13/576,935

(22) PCT Filed: Feb. 8, 2011

(86) PCT No.: PCT/NZ2011/000017
§ 371 (c)(1),
(2), (4) Date: Aug. 2, 2012

(87) PCT Pub. No.: WO2011/096831
PCT Pub. Date: Aug. 11, 2011

(65) Prior Publication Data
US 2012/0299320 A1    Nov. 29, 2012

(30) Foreign Application Priority Data
Feb. 8, 2010    (NZ) .......................................... 583181

(51) Int. Cl.
*A01B 1/22*    (2006.01)
*B25G 1/04*    (2006.01)
*B25G 3/12*    (2006.01)

(52) U.S. Cl.
CPC ... *B25G 1/04* (2013.01); *A01B 1/22* (2013.01); *B25G 3/12* (2013.01); *Y10T 29/49968* (2015.01)

(58) Field of Classification Search
USPC .......... 294/57, 49, 51, 54.5, 176; 173/90, 91, 173/132, 232; 172/18; 30/277, 367, 344
See application file for complete search history.

(56) References Cited

U.S. PATENT DOCUMENTS

| | | | | |
|---|---|---|---|---|
| 1,473,143 A | * | 11/1923 | Dean | 15/236.01 |
| 1,665,109 A | * | 4/1928 | Nelson | 30/277 |
| 1,931,349 A | * | 10/1933 | Habig | 30/315 |
| 1,931,926 A | * | 10/1933 | Johnson et al. | 30/169 |
| 2,485,877 A | * | 10/1949 | Hamilton, Jr. | 173/121 |
| D235,965 S | * | 7/1975 | Grinnell | D32/49 |
| 4,470,440 A | * | 9/1984 | Thor | 144/195.5 |
| 4,624,323 A | * | 11/1986 | Burrola | 173/90 |
| 5,040,614 A | * | 8/1991 | Nash | 172/18 |
| 5,434,063 A | * | 7/1995 | Lacks | 435/477 |
| 5,529,129 A | | 6/1996 | Byrd | |
| 5,775,674 A | * | 7/1998 | Bigham | 294/17 |
| 5,878,822 A | * | 3/1999 | Roy | 173/90 |

(Continued)

FOREIGN PATENT DOCUMENTS

GB          491687 A     9/1938
GB         1454223 A    11/1976

*Primary Examiner* — Paul T Chin
(74) *Attorney, Agent, or Firm* — Birch, Stewart, Kolasch & Birch, LLP.

(57) ABSTRACT

An implement includes a shaft, a plug, and a tool portion. The plug is received and retained at one end of the shaft, and the plug and the tool portion are adapted to engage with one another. In addition, an implement for use with a slide hammer includes a shaft which has a receiving portion at one end thereof for receiving an implement head and an aperture at the opposite end thereof forming a guiding portion for the slide hammer, a plug having first and second sections (wherein the first section is received and retained at one end of the shaft and the second portion is not received by the shaft and includes an aperture therein for receiving a tool portion), a tool portion, which includes a slot or aperture therein for engagement with both said second section of said plug and the said shaft, or part thereof.

17 Claims, 8 Drawing Sheets

(56) References Cited

U.S. PATENT DOCUMENTS

| | | | |
|---|---|---|---|
| 6,125,719 A * | 10/2000 | Lowther et al. | 81/27 |
| 6,474,198 B2 * | 11/2002 | Lowther | 81/27 |
| 6,568,729 B2 * | 5/2003 | Bailey | 294/49 |
| D547,627 S * | 7/2007 | Meads | D8/45 |
| 7,293,361 B1 * | 11/2007 | Miller | 30/164.6 |
| 7,325,625 B1 * | 2/2008 | Winters | 173/90 |
| 2003/0184104 A1 * | 10/2003 | Ping | 294/57 |
| 2004/0045412 A1 * | 3/2004 | Cotner | 81/27 |

\* cited by examiner

IMPLEMENT WITH A SHAFT ATTACHED TO A TOOL PORTION VIA A PLUG

STATEMENT OF CORRESPONDING APPLICATIONS

This application is based on the Provisional specification filed in relation to New Zealand Patent Application Number 583181, the entire contents of which are incorporated herein by reference.

TECHNICAL FIELD

The present invention relates to improvements in and relating to implements. In particular, the present invention relates to digging or driven implements, primarily those used for digging through tough materials such as hardened clay, stony or root laden ground. However this need not be seen as necessarily limiting.

BACKGROUND ART

For clarity, the present invention will be described in relation to a digging implement including a slide hammer. It will however be obvious to those skilled in the art that the method of attachment described is equally applicable to any driven implement having a head attached to a shaft. It will also be apparent that the attachment method is equally applicable to non-driven implement including a shaft and a tool portion.

Digging implements for working in tough materials such as frozen or stony ground or where tough root structures need to be severed are well known.

Slide hammer assisted digging tools are one such well known implement. The slide hammer allows the user to apply extremely high energy impulses to drive a tool portion such as an implement head through tough materials, typically the implement head will be a spade head or similar type blade.

One disadvantage associated with impact driven implements is that the impact action that provides the impetus to drive the implement head through tough materials, also applies very high shock loading to the attachment means holding the head of the implement to the shaft, such as welds, resulting in rapid failure if the implement is frequently used to dig through tough materials.

Improved durability can be obtained by using re-enforced welds and large weld surface areas. The disadvantage of such a methodology is that the welds typically run longitudinally to the handle, the majority of the weld thereby being subjected to longitudinal sheer stress. It is well known in the art that welds running longitudinally to the line of applied force are substantially less strong than welds running transversely to the line of applied force. The available contact area of the shaft capable of being welded to the implement head and transversely to the line of applied force, is therefore limited. Unless the durability or functionality of the implement is compromised in terms of strength or in terms of having an implement that will penetrate through tough materials and not be impeded by large block like welds.

It is therefore the purpose of the present invention to provide a digging implement which provides the advantages of an impact drive, but includes a novel construction methodology which results in an implement that is more robust to repetitive use in hard conditions.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to a first aspect of the present invention there is provided an implement including:
 a shaft;
 a plug;
 a tool portion,
wherein the shaft includes a hollow receiving portion in at least one end thereof into which a first portion of the plug is frictionally engaged; and
wherein the tool portion includes a slot therein which is configured to allow the tool portion to be attached to a second portion of the plug and at least a portion of the outer periphery of the shaft.

The first portion of the plug may be retained at one end of the shaft in a variety of different ways.

In one preferred embodiment the plug may have an engaging portion which is shaped and dimensioned to precision fit within a hollow section of the shaft. The lateral dimensions of the engaging portion being only marginally smaller than the lateral dimensions of the hollow section of the shaft into which plug fits.

In another preferred embodiment the first portion of the plug may have an engaging portion which is shaped and dimensioned to precision fit around a section of the shaft. The internal dimensions of the engaging portion are only marginally larger than the external dimensions of the section of the shaft.

In preferred embodiments the first portion of the plug may also be adhered to at least part of the shaft.

In other preferred embodiments, a filling agent may be inserted between the first portion of the plug and at least part of the shaft. In general, the contact area between the plug and shaft should provide a sufficiently precision fit so as to prevent relative movement therebetween.

According to a further aspect of the present invention there is provided an implement substantially as described above, further characterised in that the plug comprises a body having a second portion having a cross-sectional profile with dimensions which are larger than the cross sectional profile of the hollow receiving portion, so as to be incapable of fitting therein.

In some preferred embodiments the second portion may include an aperture or slot therein configured for the attachment of a tool portion.

The implement characterised in that any impact forces applied in a direction inline with the longitudinal axis of the shaft are transferred through the plug directly to the tool head. As will be apparent to a person skilled in the art, the second portion of the plug provides an increased weld surface area transverse to the longitudinal direction of force, thereby greatly improving the strength of the tool to longitudinally applied stresses.

In addition, longitudinally applied forces may be transferred through a number of physical connections, such as but not limited to:

a bonding agent between the first section of the plug and the internal surface of the shaft;
  contact of an end of the shaft with the second section of the plug;
  bonding agent applied externally between the plug and the outer surface of the shaft;
  frictional engagement between the first section of the plug and the inner surface of the shaft.

It will be apparent to a person skilled in the art that the use of multiple physical connections results in a much stronger connection than a system which uses any one connection method.

Similarly, for embodiments where the plug has an engaging portion which surrounds the shaft the engaging portion also provides a precision fit, or otherwise prevents relative movement between the plug and the shaft.

In preferred embodiments the tool portion is attached to the second portion of the plug by reinforced welds. It will however be obvious to those skilled in the art that the means by which the tool portion is attached to the plug could be achieved in any number of ways without departing from the scope of the present invention.

In one preferred embodiment the tool portion is attached to the plug by a filling agent such as a high strength resin. In other embodiments the tool portion is attached by crimping of the tool portion within the plug aperture.

In some embodiments the plug and tool portion may be cast as a single part.

In preferred embodiments the implement wherein the tool portion is attached to both a portion of the plug and a portion of the shaft.

In preferred embodiments the implement includes a sliding hammer, as is well known in the art, the sliding hammer including a handle portion and a slide portion.

In preferred embodiments the slide portion may, in use, be located into or onto a corresponding guide portion on or in the shaft of the implement.

In preferred embodiments the guide portion of the implement may be a substantially tubular section into which the slide portion of the slide hammer is located.

It will be obvious to those skilled in the art that the cross sectional profile of the slide portion of the slide hammer will be substantially the same as the guide portion of the implement, and could be any one of square, circular or triangular. The cross sectional profile should therefore not be seen as being limiting.

In preferred embodiments the handle portion of the slide hammer includes a plurality of apertures therein.

In preferred embodiments the slide portion of the slide hammer includes a plurality of apertures therein, each aperture corresponding to a matching aperture in the handle portion of the slide hammer. The apertures in the slide hammer handle portion and slide portion aligning coaxially upon correct location of the slide portion within the handle portion.

In preferred embodiments the slide hammer handle portion is affixed to the slide hammer slide portion by a plurality of pins located through each of the coaxially aligned apertures in the said slide hammer handle portion and slide portion.

In preferred embodiments the pins located through the said coaxially aligned apertures in the said slide hammer handle portion and slide portion are affixed into position.

In especially preferred embodiments the pins in the slide hammer are welded into position. It will however be obvious to those skilled in the art that there any number of ways in which the pins could be affixed in position, by way of example a second option could be to peen or press a solid rivet (pin) into position.

It will be apparent to those skilled in the art that by welding or otherwise permanently affixing the said pins in position through the co-axially aligned apertures, results in an increased surface transverse to the line of longitudinal force, thereby distributing the impulse stress imputed by impact of the said slide hammer with the implement when in use.

In preferred embodiments, and when in use, the slide portion of the slide hammer impacts against a region of the first portion of the plug that is located within the hollow receiving portion of the shaft. It will be apparent to a person skilled in the art that this configuration results in forces generated from the impact of the slide portion of the slide hammer with the plug being transferred directly to the implement head and not along the length of the receiving portion.

According to a further aspect of the current invention there is provided an implement for use with a slide hammer, which includes:

a shaft which has a hollow portion at one end thereof for receiving a plug and an aperture at the opposite end thereof forming a guiding portion for said slide hammer;
  a plug having a first portion, with a cross sectional profile matching the internal cross sectional profile of the hollow receiving portion; and configured to provide a precision fit within the said hollow receiving portion; and
  a tool portion, which includes a slot or aperture therein which is configured to allow the tool portion to be attached to a second portion of the plug and at least a portion of the outer periphery of the shaft.

According to another aspect of the current invention there is provided a method of attaching an implement head including a plug and a tool portion to a shaft, the method including the steps of:

a) configuring the plug of an implement head or a portion thereof to have a first section dimensioned to provide a precision fit to an aperture in one end of the shaft;
  b) fitting said first section of the plug of the implement head or a portion thereof to the shaft;
  c) welding said plug to the said shaft at the region where the shaft circumferentially abuts said plug;
  d) sliding the tool portion over both a portion of the plug and around a portion of the outer periphery of the shaft; and
  e) welding the implement head to both the plug and the shaft.

According to a further aspect of the present invention there is provided a shaft of an implement substantially as described above, wherein the shaft includes a slide hammer at one end thereof.

BRIEF DESCRIPTION OF THE DRAWINGS

Further aspects of the present invention will become apparent from the following description which is given by way of example only and with reference to the accompanying drawings in which.

BEST MODES FOR CARRYING OUT THE INVENTION

Figure 1:
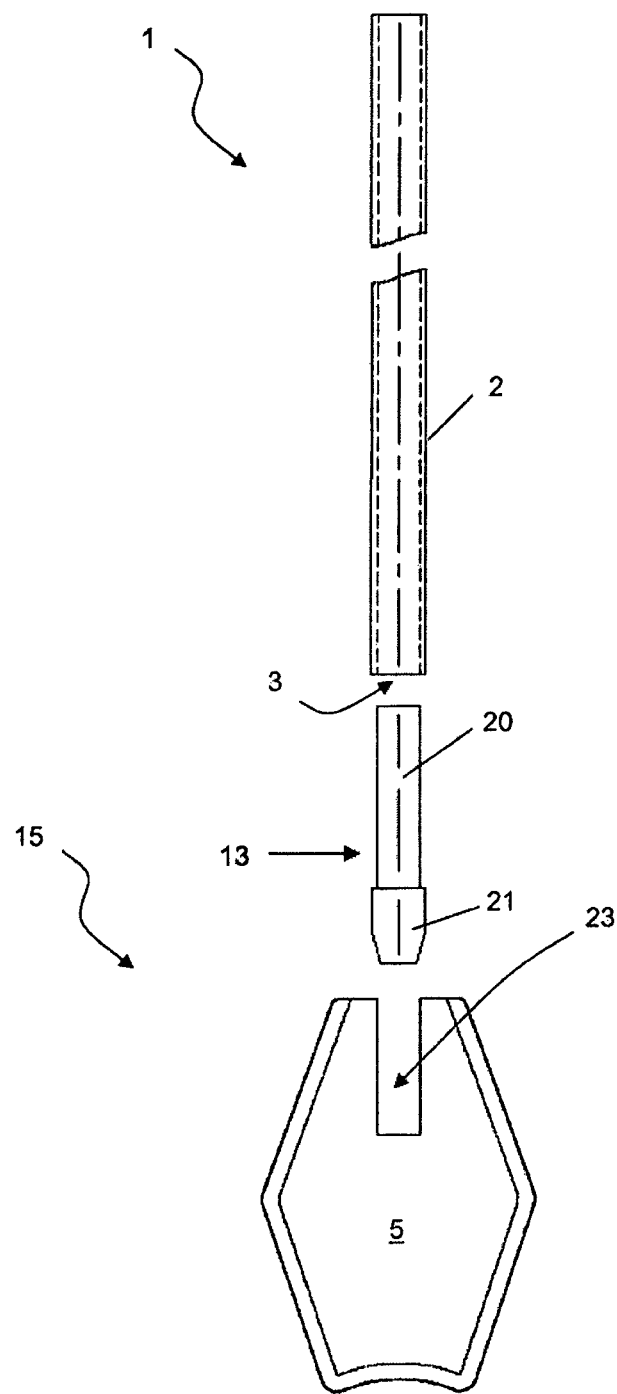
FIG. 1 an exploded view of an implement.
Figure 2:
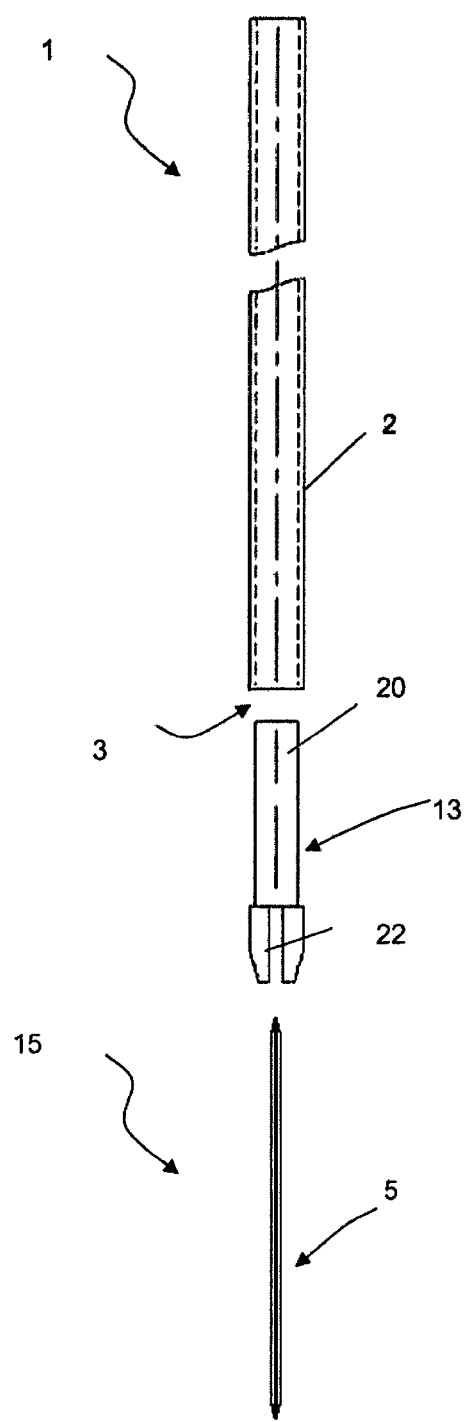
FIG. 2 an exploded side profile of the implement of FIG. 1.
Figure 3:
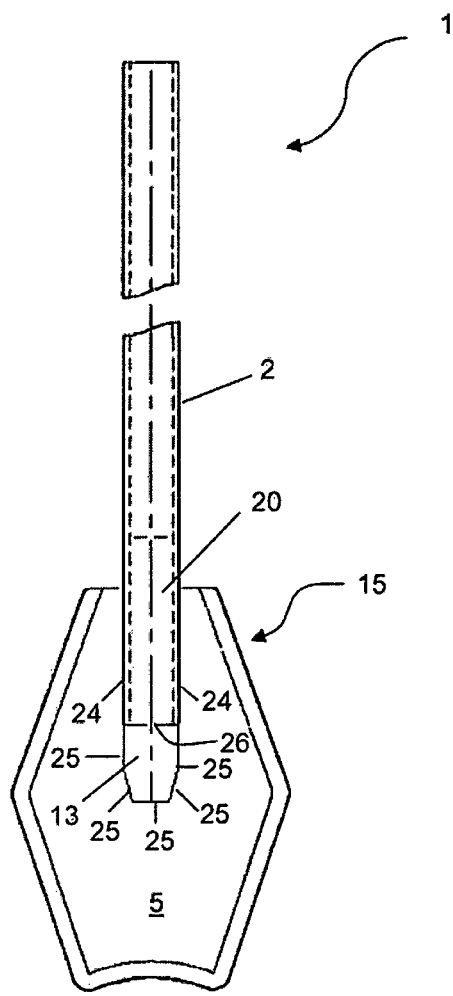
FIG. 3 an assembled implement of FIG. 1.

With respect to FIG. 1 and FIG. 2, there is shown an exploded view of a digging implement, as generally indicated by arrow 1. The digging implement (1) has a shaft (2), which has a receiving portion in the form of an aperture (3) at one end thereof. The digging implement (1) also has an implement head (15), the implement head (15) including a plug (13) having; a first section (20) with a cross sectional profile (not shown)(but which is, in the preferred embodiment, substantially circular in cross sectional profile) matching the profile (not shown)(but which is in the preferred embodiment, substantially circular in cross sectional profile) of the receiving portion (3) of the shaft (2); and a second section (21) which has a cross sectional profile (not shown)(but which is in the preferred embodiment, substantially circular in cross sectional profile) which is not capable of fitting into the receiving portion (3) of the shaft (2).

With respect to FIGS. 1, 2, 3 and 4 there is shown a digging implement (1) including a shaft (2) and an implement head (15). The implement head (15) including a plug (13) which is attached to tool portion (5), which in this embodiment is a blade. The tool portion (5) includes aperture (23) into which the plug (13) is located, the plug second section (21) includes aperture (22), shown in FIG. 2, into which the tool portion (5) locates when the plug (13) is positioned in the tool portion (5) aperture (23), this is most clearly shown in FIG. 4. The blade is welded (not shown) in place along the adjacent edges (25) of the plug second section (21) and tool portion (5) surface. The plug (13) is fittingly engaged within the receiving portion (3) of the shaft (2), shown in FIGS. 2 and 3.

The implement head (15) is affixed to the shaft (2) by fitting engagement between the first section (20) of the plug (13) and the receiving portion (3) of the shaft (2). The plug (13) is welded (not shown) to the shaft (2) along the adjacent edges (26) of the first portion of the plug (13) and the shaft (2), the tool portion (5) is welded to the shaft (2) along the adjacent edges (24) of the tool portion (5) aperture (23) and the sides of the shaft (2).

Figure 4:
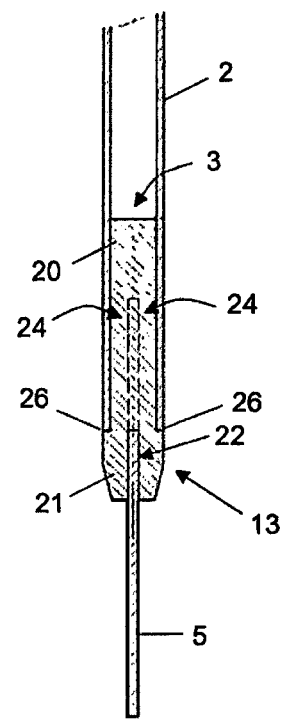
FIG. 4 a cross sectional view of the implement of FIG. 2.

With respect to FIG. 4, there is shown a cross sectional view of the implement (1), including a shaft (2) and implement head (15). The implement head (15) including a plug (13) and a tool portion (5). The plug (13) having a first section (20) shown inserted into the receiving portion (3) of the shaft (2). The second section (21) of the plug (13) abuts the shaft (2) when fully inserted.

The second section (21) of the plug (13) includes aperture (22) into which the tool portion (5) inserts.

The shaft (2) also includes a guide region (7) in the form of a hollow interior into which a slide hammer (not shown in FIG. 1, 2 or 3) can be located.

Figure 5:
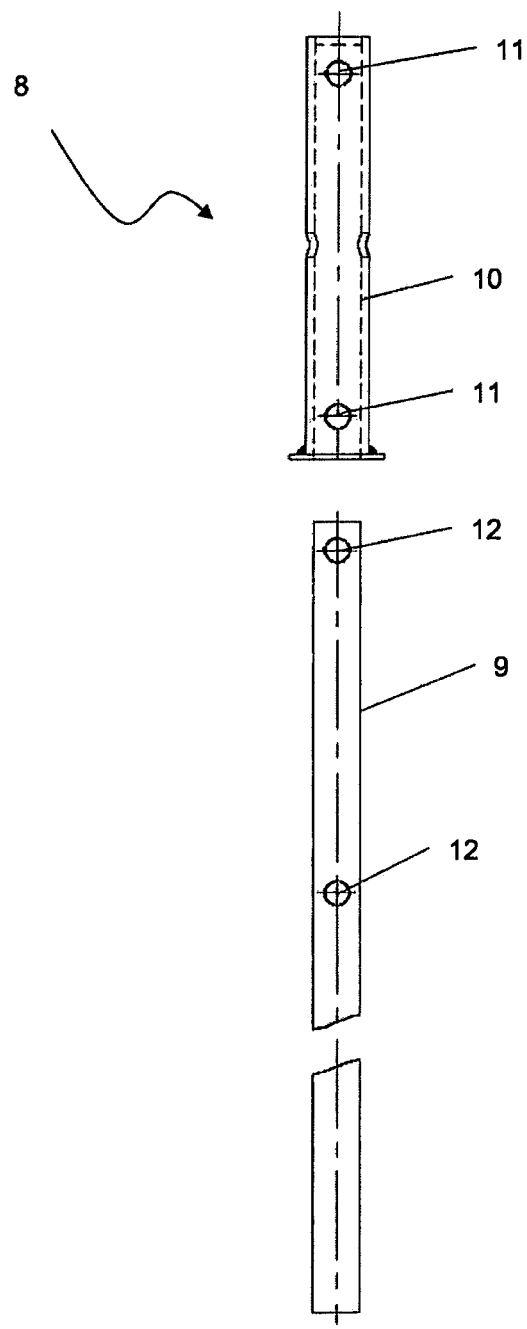
FIG. 5 an exploded view of a slide hammer.

With respect to FIG. 5, there is shown an exploded view of a slide hammer (8), having a slide portion (9), and a handle portion (10). The slide portion (9) being inserted into the handle portion (10), such that one or more apertures (11) in the handle portion (10) align coaxially with corresponding apertures (12) in the slide portion (9) when the slide portion (9) is located therein. With respect to FIG. 6, there is shown a slide hammer (8) including a slide portion (9) affixed to a handle portion (10) by pins (16) passing through the said coaxially aligned apertures (11, 12) in the handle portion (10) and slide portion (9).

Figure 6:
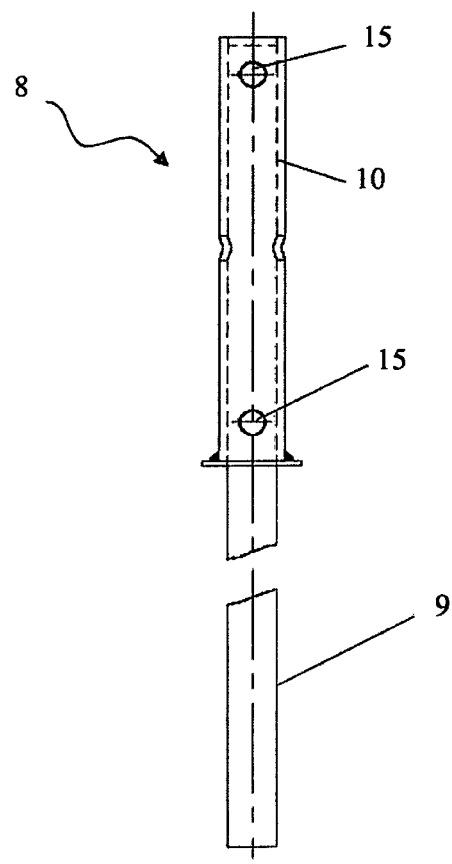
FIG. 6 an assembled slide hammer of FIG. 3.
Figure 7:
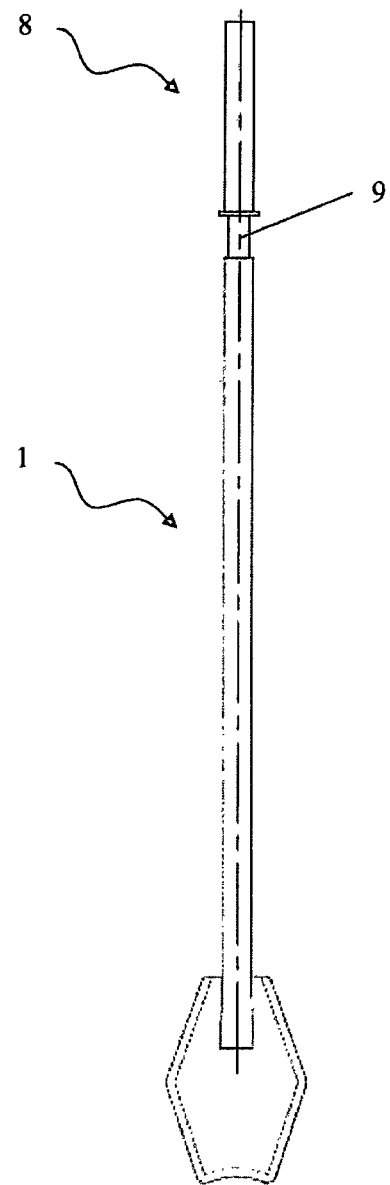
FIG. 7 a view of an implement including a slide hammer in an impacted position.

With respect to FIG. 7, there is shown a digging implement (1) including a slide hammer (8) in an impacted position, the slide hammer (8) slide portion (9) abutting the plug of the implement head (13 in FIG. 1, not shown in FIG. 6).

Figure 8:
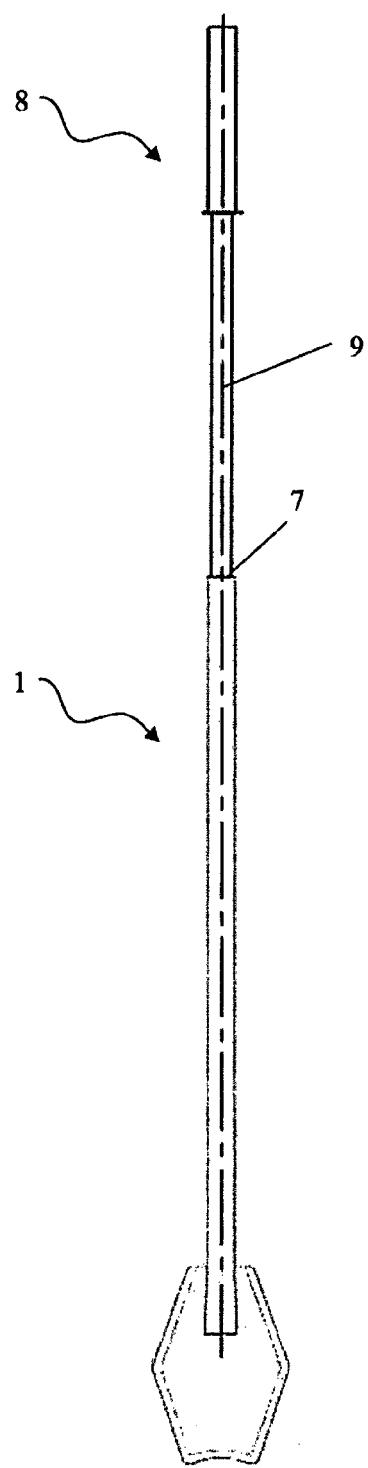
FIG. 8 a view of an implement including a slide hammer in an extended position.

With respect to FIG. 8, there is shown a digging implement (1) including a slide hammer (8) in an extended position, the slide hammer (8) slide portion (9) being guided by the guide portion (7).

Aspects of the present invention have been described by way of example only and it should be appreciated that modifications and additions may be made thereto without departing from the scope thereof as defined in the appended claims.

What I claim is:

1. An implement including:
   a shaft;
   a plug;
   a tool portion,
   wherein the shaft includes a hollow receiving portion in at least one end thereof into which a first portion of the plug is frictionally engaged; and
   wherein the tool portion includes a slot therein which is configured to allow the tool portion to be attached to a second portion of the plug and at least a portion of the outer periphery of the shaft.

2. The implement of claim 1 wherein the plug includes an engaging portion which is shaped and dimensioned to precision fit within a hollow section of the shaft.

3. The implement of claim 1 wherein the first portion of the plug includes an engaging portion which is shaped and dimensioned to precision fit around a section of the shaft.

4. The implement of claim 1 wherein the first portion of the plug is adhered to at least part of the shaft.

5. The implement of claim 1 wherein the plug body includes:
   a second portion having a cross-sectional profile with dimensions which are larger than the cross sectional profile of the hollow receiving portion of the shaft, so as to be incapable of fitting therein.

6. The implement of claim 1 wherein the tool portion is attached to the second portion of the plug by reinforced welds.

7. The implement of claim 1 wherein the tool portion is attached to the plug by a bonding agent such as a high strength resin.

8. The implement of claim 1 wherein the plug and tool portion are cast as a single part.

9. The implement of claim 1 further including a sliding hammer having a handle portion and a slide portion.

10. The implement of claim 9 wherein the slide portion is located into or onto a corresponding guide portion on or in the shaft of the implement.

11. The implement of claim 10 wherein the guide portion of the implement is a substantially tubular section into which the slide portion of the slide hammer is located.

12. The implement of claim 10 wherein the slide portion of the slide hammer includes a plurality of apertures therein, each aperture corresponding to a matching aperture in the handle portion of the slide hammer.

13. The implement of claim 12 wherein the slide hammer handle portion is affixed to the slide hammer slide portion by a plurality of pins located through each of the coaxially aligned apertures in the said slide hammer handle portion and slide portion.

14. The implement of claim 13 wherein the pins in the slide hammer are welded into position.

15. The implement of claim 9 wherein, in use, the slide portion of the slide hammer impacts against a region of the first section of the plug that is located within the receiving portion of the shaft.

16. An implement for use with a slide hammer, which includes:
- a shaft which has a hollow portion at one end thereof for receiving a plug and an aperture at the opposite end thereof forming a guiding portion for said slide hammer;
- a plug having a first portion, with a cross sectional profile matching the internal cross sectional profile of the hollow portion and configured to provide a precision fit within said hollow portion; and
- a tool portion, which includes a slot or aperture therein which is configured to allow the tool portion to be attached to a second portion of the plug and at least a portion of the outer periphery of the shaft.

17. A method of attaching an implement head including a plug and a tool portion to a shaft, including the steps of:
- a) configuring the plug of an implement head or a portion thereof to have a first section dimensioned to provide a precision fit to an aperture in one end of the shaft;
- b) fitting said first section of the plug of the implement head or a portion thereof to the shaft;
- c) welding said plug to the said shaft at the region where the shaft circumferentially abuts said plug;
- d) sliding the tool portion over both a portion of the plug and around a portion of the outer periphery of the shaft; and
- e) welding the implement head to both the plug and to the shaft.

* * * * *